(12) United States Patent
Jeon

(10) Patent No.: US 12,713,382 B2
(45) Date of Patent: Aug. 18, 2026

(54) POSITIONING BASED ON PREDICTION IN CELLULAR SYSTEMS

(71) Applicant: Samsung Electronics Co., Ltd., Suwon-si (KR)

(72) Inventor: Jeongho Jeon, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 18/492,570

(22) Filed: Oct. 23, 2023

(65) Prior Publication Data

US 2024/0155544 A1 May 9, 2024

Related U.S. Application Data

(60) Provisional application No. 63/422,089, filed on Nov. 3, 2022.

(51) Int. Cl.
*H04W 64/00* (2009.01)

(52) U.S. Cl.
CPC .................................. *H04W 64/00* (2013.01)

(58) Field of Classification Search
CPC ........ G01S 5/0036; G01S 5/01; G01S 5/0278; G06N 20/00; G06N 20/10; G06N 3/044; G06N 3/045; G06N 3/048; G06N 3/08; G06N 3/084; H04W 64/00
See application file for complete search history.

(56) References Cited

U.S. PATENT DOCUMENTS

| | | | | |
|---|---|---|---|---|
| 2021/0328630 | A1 | 10/2021 | Ryu et al. | |
| 2022/0046386 | A1 * | 2/2022 | Sundararajan | H04W 4/029 |
| 2024/0056844 | A1 * | 2/2024 | Zhu | H04W 16/28 |
| 2025/0142291 | A1 * | 5/2025 | Thomas | H04W 24/02 |
| 2025/0323770 | A1 * | 10/2025 | Saha | H04L 5/0051 |

OTHER PUBLICATIONS

International Search Report and Written Opinion issued Feb. 8, 2024 regarding International Application No. PCT/KR2023/017273, 7 pages.

Lenovo, “Discussion on AI for air interface use cases”, 3GPP TSG-RAN WG2 Meeting #119bis-e, R2-2209952, Oct. 2022, 7 pages.

(Continued)

*Primary Examiner* — Timothy X Pham

(57) ABSTRACT

Methods and apparatuses for user equipment (UE) positioning based on prediction in cellular systems. A method for a UE to report information related to UE positioning based on machine learning (ML) includes receiving, from a cell, first information related to reception of positioning reference signals (PRSs) from one or more transmission and reception points (TRPs) for measurements; receiving from the cell, second information indicating one or more reporting quantities related to the UE positioning; receiving, from the cell, third information related to transmitting the one or more reporting quantities; and receiving, from the one or more TRPs, the PRSs based on the first information. The method further includes measuring the PRSs; determining the one or more reporting quantities indicated by the second information based on the measurement of the PRSs; and transmitting a channel with the one or more reporting quantities based on the third information.

20 Claims, 12 Drawing Sheets

(56) References Cited

OTHER PUBLICATIONS

Moderator (Oppo), "Summary #6 for other aspects on AI/ML for beam management", 3GPP TSG RAN WG1 #110bis-e, R1-2210764, Oct. 2022, 154 pages.
Nvidia, "General aspects of AI and ML framework for NR air interface", 3GPP TSG-RAN WG1 Meeting #110bis-e, R1-2209624, Oct. 2022, 19 pages.
Ericsson, "Evaluations on AI-Pos", 3GPP TSG-RAN WG1 Meeting #109-e, R1-2203285, May 2022, 16 pages.
LG Electronics Inc., "Aspect of ML model provisioning between UE and network", 3GPP TSG-RAN2 #119bis, R2-2210564, Oct. 2022, 6 pages.
"3rd Generation Partnership Project; Technical Specification Group Radio Access Network; NR; Physical channels and modulation (Release 17)", 3GPP TS 38.211 V17.2.0, Jun. 2022, 136 pages.
"3rd Generation Partnership Project; Technical Specification Group Radio Access Network; NR; Multiplexing and channel coding (Release 17)", 3GPP TS 38.212 V17.2.0, Jun. 2022, 201 pages.
"3rd Generation Partnership Project; Technical Specification Group Radio Access Network; NR; Physical layer procedures for control (Release 17)", 3GPP TS 38.213 V17.2.0, Jun. 2022, 256 pages.
"3rd Generation Partnership Project; Technical Specification Group Radio Access Network; NR; Physical layer procedures for data (Release 17)," 3GPP TS 38.214 V17.2.0 , Jun. 2022, 228 pages.
5G; NR; Physical layer measurements (3GPP TS 38.215 version 17.1.0 Release 17), ETSI TS 138 215 V17.1.0, Apr. 2022, 32 pages.
"5G; NR; Medium Access Control (MAC) protocol specification (3GPP TS 38.321 version 17.1.0 Release 17)", ETSI TS 138 321 V17.1.0 , Aug. 2022, 244 pages.
"5G; NR; Radio Resource Control (RRC); Protocol specification (3GPP TS 38.331 version 17.1.0 Release 17)", ETSI TS 138 331 V17.1.0, Aug. 2022, 1257 pages.
"5G; NR; Requirements for support of radio resource management (3GPP TS 38.133 version 17.6.0 Release 17)", ETSI TS 138 133 V17.6.0, Sep. 2022, 3348 pages.
"5G; NR; NR and NG-RAN Overall description; Stage-2 (3GPP TS 38.300 version 17.0.0 Release 17)", ETSI TS 138 300 V17.0.0, May 2022, 207 pages.
"5G; NG Radio Access Network (NG-RAN); Stage 2 functional specification of User Equipment (UE) positioning in NG-RAN (3GPP TS 38.305 version 17.1.0 Release 17)", ETSI TS 138 305 V17.1.0, Aug. 2022, 135 pages.
"5G; NG-RAN; NR Positioning Protocol A (NRPPa) (3GPP TS 38.455 version 17.2.0 Release 17)", ETSI TS 138 455 V17.2.0, Oct. 2022, 199 pages.
Extended European Search Report issued Sep. 12, 2025 regarding Application No. 23886272.6, 10 pages.

* cited by examiner

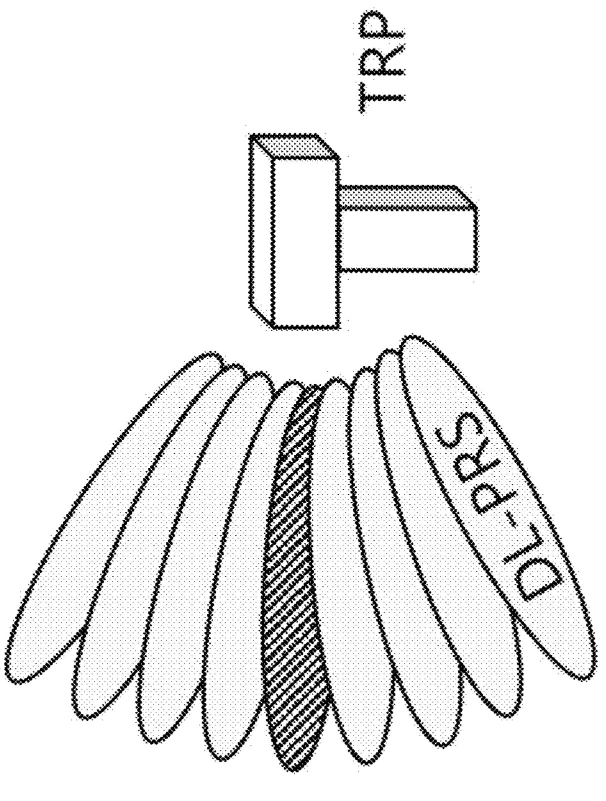
FIG. 5
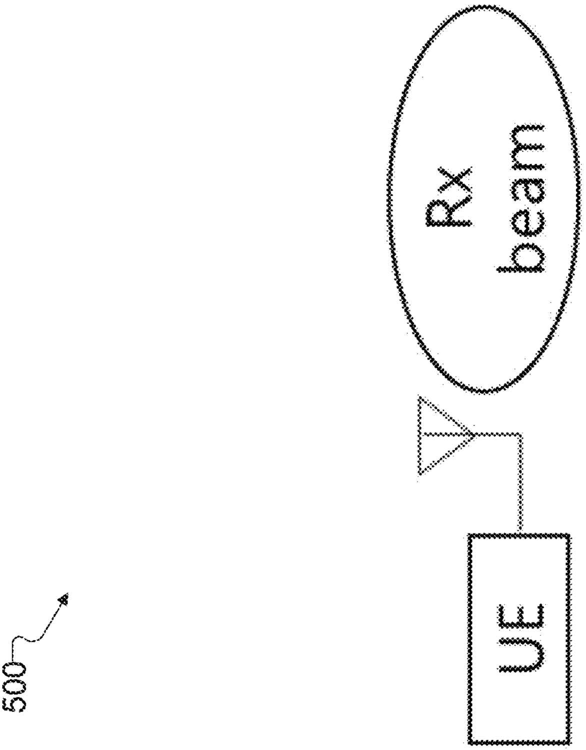

810 A UE is provided from LMF information related to mapping a first set of DL-PRS beams to a second set of DL-PRS beams for each TRPs transmitting DL-PRS to the UE and one or multiple instances for DL-PRS RSRP beam prediction and reporting.

820 The UE performs DL-PRS measurements on the first set of beams from each TRP transmitting DL-PRS according to the resource configuration provided by LMF.

830 The UE predicts DL-PRS RSRP of the second set of beams based on the measurements on the first set of beams for each TRP transmitting DL-PRS for one or multiple instances indicated by LMF.

840 The UE sends the report on its predicted DL-PRS RSRP to the LMF along with assistance information.

FIG. 8

POSITIONING BASED ON PREDICTION IN CELLULAR SYSTEMS

CROSS-REFERENCE TO RELATED AND CLAIM OF PRIORITY

The present application claims priority under 35 U.S.C. § 119(e) to U.S. Provisional Patent Application 63/422,089 filed on Nov. 3, 2022, which is hereby incorporated by reference in its entirety.

TECHNICAL FIELD

The present disclosure relates generally to wireless communication systems and, more specifically, the present disclosure relates to methods and apparatus for user equipment (UE) positioning based on prediction in cellular systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to UE positioning based on prediction in cellular systems.

In an embodiment, a method for a UE to report information related to UE positioning based on machine learning (ML) is provided. The method includes receiving, from a cell, first information related to reception of positioning reference signals (PRSs) from one or more transmission and reception points (TRPs) for measurements; receiving from the cell, second information indicating one or more reporting quantities related to the UE positioning; receiving, from the cell, third information related to transmitting the one or more reporting quantities; and receiving, from the one or more TRPs, the PRSs based on the first information. The one or more reporting quantities are related to the UE positioning based on a ML model or a life cycle management of the ML model. The method further includes measuring the PRSs; determining the one or more reporting quantities indicated by the second information based on the measurement of the PRSs; and transmitting a channel with the one or more reporting quantities based on the third information.

In another embodiment, a UE is provided. The UE includes a transceiver configured to receive, from a cell, first information related to reception of PRSs from one or more TRPs for measurements; receive, from the cell, second information indicating one or more reporting quantities related to UE positioning; receive, from the cell, third information related to transmitting the one or more reporting quantities; and receive, from the one or more TRPs, the PRSs based on the first information. The one or more reporting quantities are related to the UE positioning based on a ML model or a life cycle management of the ML model. The UE further includes a processor operably coupled with the transceiver. The processor is configured to measure the PRSs and determine the one or more reporting quantities indicated by the second information based on the measurement of the PRSs. The transceiver is further configured to transmit a channel with the one or more reporting quantities based on the third information.

In yet another embodiment, a base station (BS) is provided. The BS includes a transceiver configured to transmit first information related to reception of PRSs from one or more TRPs for measurements, transmit second information indicating one or more reporting quantities related to UE positioning, transmit third information related to transmitting the one or more reporting quantities, wherein the PRSs are transmitted from the one or more TRPs based on the first information, and receive, based on the third information, a channel with the one or more reporting quantities, the one or more reporting quantities based on the second information and the PRSs. The one or more reporting quantities are related to the UE positioning based on a ML model or a life cycle management of the ML model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a diagram of an example beam sweeping for downlink (DL)-angle of departure (AoD) measurement according to embodiments of the present disclosure;

FIG. 8 illustrates a flowchart of an example procedure for a UE to send prediction-based DL-AoD measurement reports to assist positioning at location management function (LMF) according to embodiments of the present disclosure;

DETAILED DESCRIPTION

Figure 1:
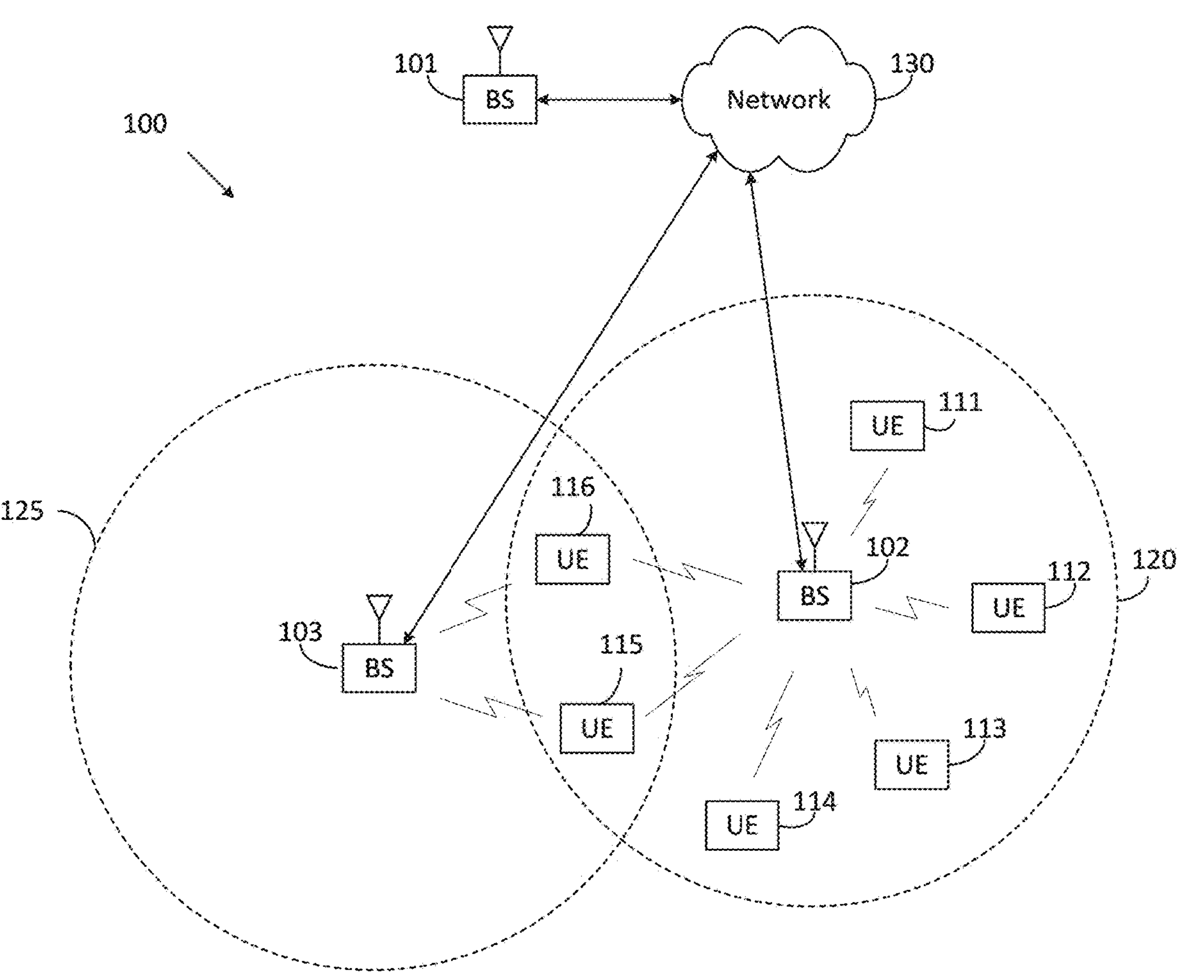
FIG. 1 illustrates an example wireless network according to embodiments of the present disclosure.

FIGS. 1-12, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v17.2.0, "NR; Physical channels and modulation;" [2] 3GPP TS 38.212 v17.2.0, "NR; Multiplexing and Channel coding;" [3] 3GPP TS 38.213 v17.2.0, "NR; Physical Layer Procedures for Control;" [4] 3GPP TS 38.214 v17.2.0, "NR; Physical Layer Procedures for Data;" [5] 3GPP TS 38.215 v17.1.0, "NR; Physical layer measurements;" [6] 3GPP TS 38.331 v17.1.0, "NR; Radio Resource Control (RRC) Protocol Specification;" [7] 3GPP TS 38.321 v17.1.0, "NR; Medium Access Control (MAC) protocol specification;" [8] 3GPP TS 38.133 v17.6.0, "NR; Requirements for support of radio resource management;" [9] 3GPP TS 38.300 v17.0.0, "NR; NR and NG-RAN Overall Description;" 3GPP TS 38.305 v17.1.0, "NG Radio Access Network (NG-RAN); Stage 2 functional specification of User Equipment (UE) positioning in NG-RAN;" and 3GPP TS 38.455 v17.2.0, "NG-RAN; NR Positioning Protocol A (NRPPa)."

Figure 2:
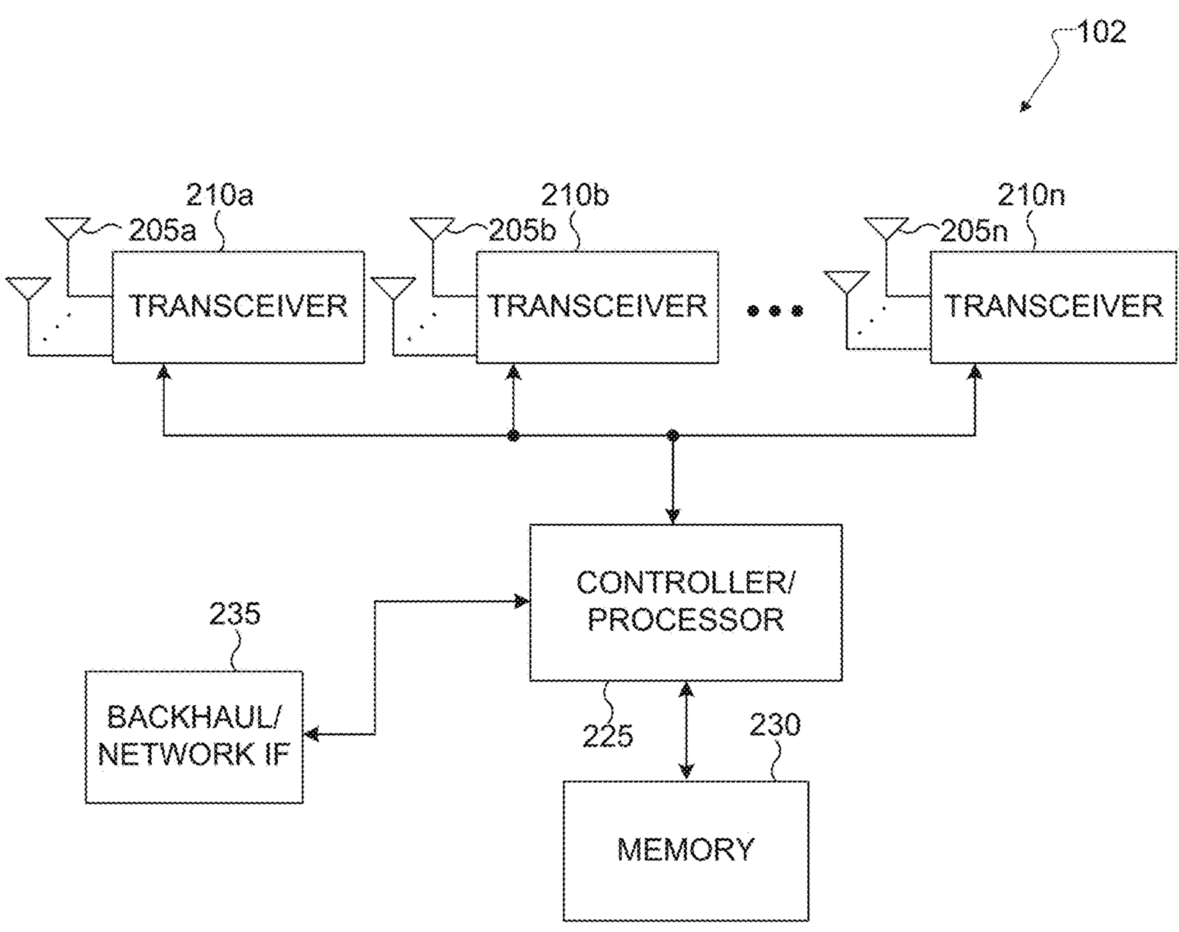
FIG. 2 illustrates an example gNodeB (gNB) according to embodiments of the present disclosure.
Figure 3:
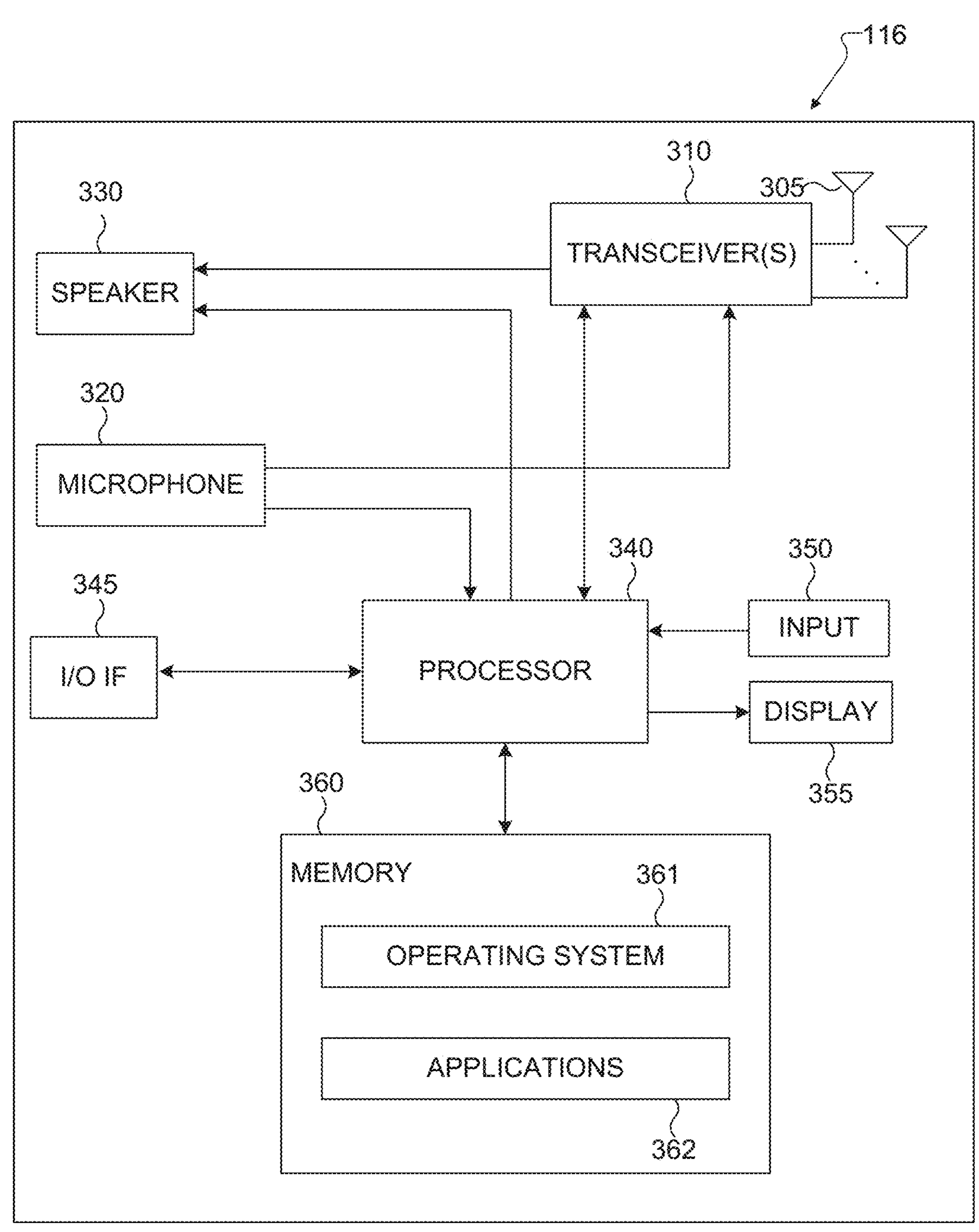
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting UE positioning based on prediction in cellular systems. In certain embodiments, one or more of the BSs 101-103 include circuitry, programing, or a combination thereof for utilizing UE positioning based on prediction in cellular systems.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for utilizing UE positioning based on prediction in cellular systems. Any of a wide variety of other functions could be supported in the gNB 102 by the controller/processor 225**.

The controller/processor 225 is also capable of executing programs and other processes resident in the memory 230, such as processes for utilizing UE positioning based on prediction in cellular systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for supporting UE positioning based on prediction in cellular systems as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
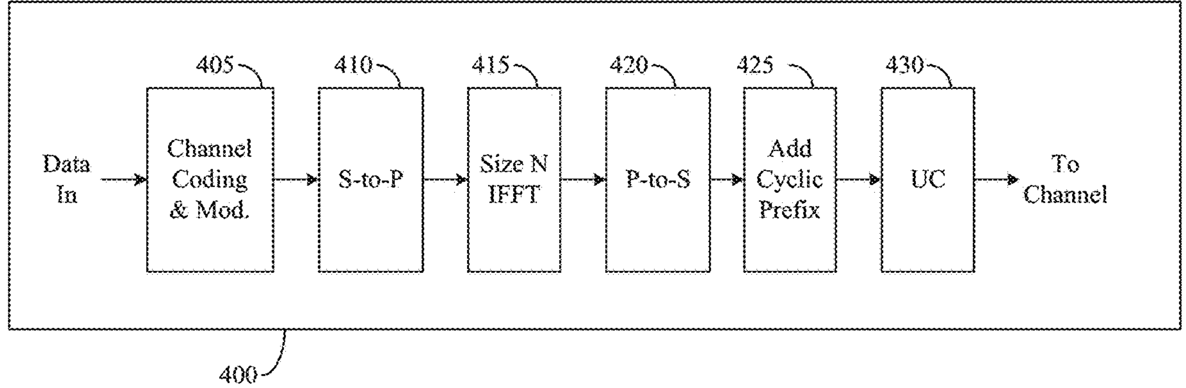
FIGS. 4A and 4B illustrate an example of a wireless transmit and receive paths according to embodiments of the present disclosure.
Figure 4B:
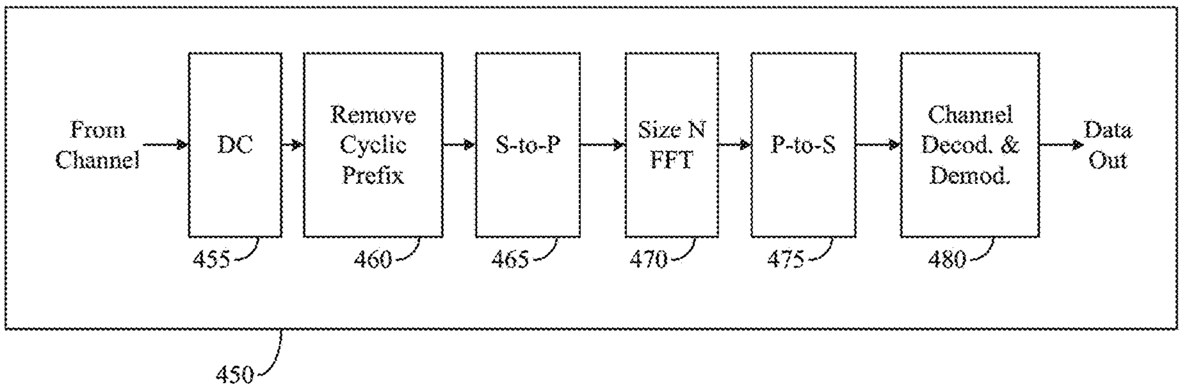

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to utilize UE positioning based on prediction in cellular systems as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In the following, an italicized name for a parameter implies that the parameter is provided by higher layers.

DL transmissions or UL transmissions can be based on an OFDM waveform including a variant using DFT precoding that is known as DFT-spread-OFDM that is typically applicable to UL transmissions.

In the following, subframe (SF) refers to a transmission time unit for the LTE RAT and slot refers to a transmission time unit for an NR RAT. For example, the slot duration can be a sub-multiple of the SF duration. NR can use a different DL or UL slot structure than an LTE SF structure. Differences can include a structure for transmitting physical downlink control channels (PDCCHs), locations and structure of demodulation reference signals (DM-RS), transmission duration, and so on. Further, eNB refers to a base station serving UEs operating with LTE RAT and gNB refers to a base station serving UEs operating with NR RAT. Exemplary embodiments consider a same numerology, that includes a sub-carrier spacing (SCS) configuration and a cyclic prefix (CP) length for an OFDM symbol, for transmission with LTE RAT and with NR RAT. In such case, OFDM symbols for the LTE RAT as same as for the NR RAT, a subframe is same as a slot and, for brevity, the term slot is subsequently used in the remaining of the disclosure.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu}\cdot 15$ kHz. A unit of one sub-carrier over one symbol is referred to as resource element (RE). A unit of one RB over one symbol is referred to as physical RB (PRB).

The UE Positioning function of NG-RAN provides the mechanisms to support or assist the calculation of the geographical position of a UE. UE position knowledge can be used, for example, in support of Radio Resource Management functions as well as location-based services for operators, subscribers, and third-party service providers. Among various positioning techniques supported in NR, several example positioning techniques are described herein.

The Multi-round trip time (RTT) positioning method makes use of the UE Rx-Tx time difference measurements, DL-PRS-received signal receive power (RSRP) and DL-PRS-reference signal received path power (RSRPP) of downlink signals received from multiple TRPs measured by the UE and the measured gNB Rx-Tx time difference measurements, UL-sounding reference signal (SRS)-RSRP, and UL-SRS-RSRPP at multiple TRPs of uplink signals transmitted from UE. The UE measures the UE Rx-Tx time difference measurements (and optionally DL-PRS-RSRP and/or DL-PRS-RSRPP of the received signals) using assistance data received from the positioning server. The TRPs measure the gNB Rx-Tx time difference measurements (and optionally UL-SRS-RSRP and/or UL-SRS-RSRPP of the received signals) using assistance data received from the positioning server. The measurements are used to determine the RTT at the positioning server which are used to estimate the location of the UE.

The DL-AoD positioning method makes use of the measured DL-PRS-RSRP and DL-PRS-RSRPP of downlink signals received from multiple transmit points (TPs), at the UE. The UE measures the DL-PRS-RSRP and the DL-PRS-RSRPP of the received signals using assistance data received from the positioning server. The resulting measurements are used along with other configuration information to locate the UE in relation to the neighboring TPs.

The DL-time difference of arrival (TDOA) positioning method makes use of the DL RSTD (and optionally DL-PRS-RSRP and DL-PRS-RSRPP) of downlink signals received from multiple TPs at the UE. The UE measures the DL RSTD (and optionally DL-PRS-RSRP and DL-PRS-RSRPP) of the received signals using assistance data received from the positioning server. The resulting measurements are used along with other configuration information to locate the UE in relation to the neighboring TPs.

The UL-TDOA positioning method makes use of the UL-relative time of arrival (RTOA) (and optionally UL-SRS-RSRP and UL-SRS-RSRPP) at multiple receive points (RPs) of uplink signals transmitted from UE. The TRPs measure the UL-RTOA (and optionally UL-SRS-RSRP and UL-SRS-RSRPP) of the received signals using assistance data received from the positioning server. The resulting measurements are used along with other configuration information to estimate the location of the UE.

The UL-AoA positioning method makes use of the measured azimuth angle of arrival (A-AoA) and zenith angle of arrival (Z-AoA) at multiple RPs of uplink signals transmitted from the UE. The RPs measure A-AoA and Z-AoA (and optionally UL-SRS-RSRPP) of the received signals using assistance data received from the positioning server. The resulting measurements are used along with other configuration information to estimate the location of the UE.

In the present network, the applications and the standardization impact of AWL-based methods have been mostly limited to network layers. There have been standardization efforts related to AI/ML functions in the O-RAN Alliance and the Third Generation Partnership Project (3GPP). In particular, the O-RAN Alliance is developing a virtualized RAN with open interfaces and network intelligence with entities such as Non-Real-Time (RT) RAN Intelligence Controller (MC) and near-RT RIC. The Non-RT MC is a logical function that enables non-real-time control and optimization of RAN elements and resources, which governs the overall AI/ML workflow for an O-RAN network, including model training, inference, and updates. The Near-RT MC is a logical function that enables near-real-time control and optimization of RAN elements and resources via fine-grained data collection and actions over the RAN interface. On the other hand, the 3GPP has defined Network Data Analytics Function (NWDAF) for network slice management in Rel-15 and it has been further enhanced in Rel-16 and Rel-17. The 3GPP also defined the functional framework for RAN intelligence enabled by data collection.

It is expected that AI/ML methods will be applied for various cellular system air interface designs including channel state information (CSI) compression/recovery, future CSI prediction, learning-based channel estimation, channel coding, and modulation, just to name a few. Common physical layer algorithms have been derived based on the simplifying assumptions such as linear system model, Additive White Gaussian Noise (AWGN) channel, etc. By exploiting AI/ML methods, an optimal algorithm can be developed for more practical system assumptions such as nonlinearity, fading channels, etc.

It is also expected that, depending on the use cases, the improvements can be not only on the system performance such as throughput, spectral efficiency, and latency but also on the complexity, reliability, overhead, etc. Moreover, the optimization can be done not only in the piecewise manner for a given transmitter/receiver processing function but also in the end-to-end manner including the entire transmitter/receiver processing chains. Therefore, it is expected that the scope of AI/ML application in the cellular system will be continuously expanded.

For AWL-based positioning, both direct AWL-based positioning and AI/ML-assisted positioning can be possible. In AI/ML-based positioning, an output of an AWL model is the UE location based on inputs such as DL-PRS measurements. The design of AWL models for direct positioning may be neither based on any particular common positioning technique nor subject to a specific DL-PRS resource configuration and transmission scheme associated with a particular positioning technique. An AWL model itself can be trained in such a way that it learns implicitly the underlying channel physics and directly estimates the UE position.

In an AWL-assisted positioning, output of AWL model includes intermediate metrics such as Rx-Tx time difference, DL-RSTD, UL-RTOA, UL-AoA, DL-AoD, DL-PRS-RSRP and/or DL-PRS-RSRPP, which can be utilized by a common positioning technique. If these intermediate metrics can be measured precisely, e.g., in line-of-sight (LOS) environment, the common positioning techniques based on multilateration computations are expected to perform well. However, in heavy scattered non-LOS (NLOS) environment, these intermediate metrics are difficult to be measured precisely. With sufficient dataset, an AI/ML model can estimate the true intermediate metrics from the noisy and super-positioned multipath DL-PRS signals. As long as these intermediate metrics can be estimated precisely, one can expect that common positioning techniques will still work well as expected. The design of an AWL model for AWL-assisted positioning will be subject to a particular common positioning technique assumed to be used by the network and corresponding DL-PRS resource configuration and transmission scheme associated with the assumed positioning technique.

FIG. 5 illustrates a diagram of an example beam sweeping 500 for DL-AoD measurement according to embodiments of the present disclosure. For example, beam sweeping 500 for DL-AoD may be performed by any of the UEs 111-116 of FIG. 1. This example is for illustration only and other embodiments can be used without departing from the scope of the present disclosure.

In DL-AoD based positioning, a UE (e.g., UE 116) estimates DL-AoD by measuring RSRP of DL-PRS beams swept by each TRP (e.g., BS 102 and/or antennas 205*a*-*n*).

Figure 6:
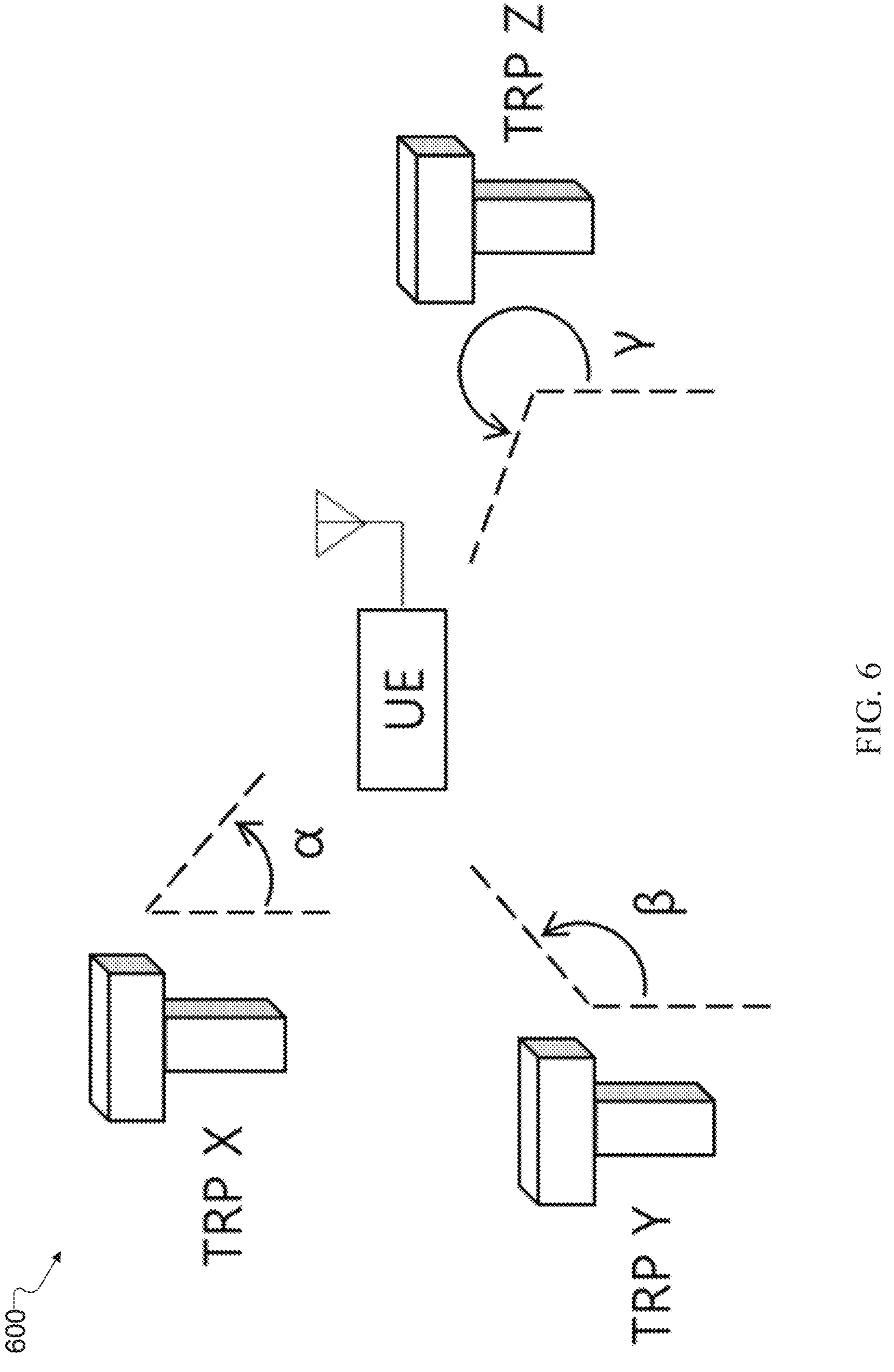
FIG. 6 illustrates a diagram of DL-angle of departure (AoD) measurement from multi-TRPs according to embodiments of the present disclosure.

FIG. 6 illustrates a diagram of DL-AoD measurement 600 from multi-TRPs according to embodiments of the present disclosure. For example, DL-AoD measurement 600 from TRPs can be performed by any of the UEs 111-116 of FIG. 1 to measure the TRPs such as BS 102-103 and/or antennas 205*a*-*n*. This example is for illustration only and other embodiments can be used without departing from the scope of the present disclosure.

DL-AoD method involves serving TRP and at least one neighboring TRP of a same cell or different cells.

Once DL-AoD measurements from multiple TRPs are obtained, angular multilateration is performed either at the LMF, i.e., UE-assisted positioning, or at the UE, i.e., UE-based positioning.

As an example of AWL-assisted positioning, the AWL model can improve the DL-AoD measurement in challenging situations such as NLOS environment, estimate DL-AoD in fine granularity from sparse or wide DL-PRS beam sweeping, or predict DL-AoD for one or multiple future instances.

Figure 7:
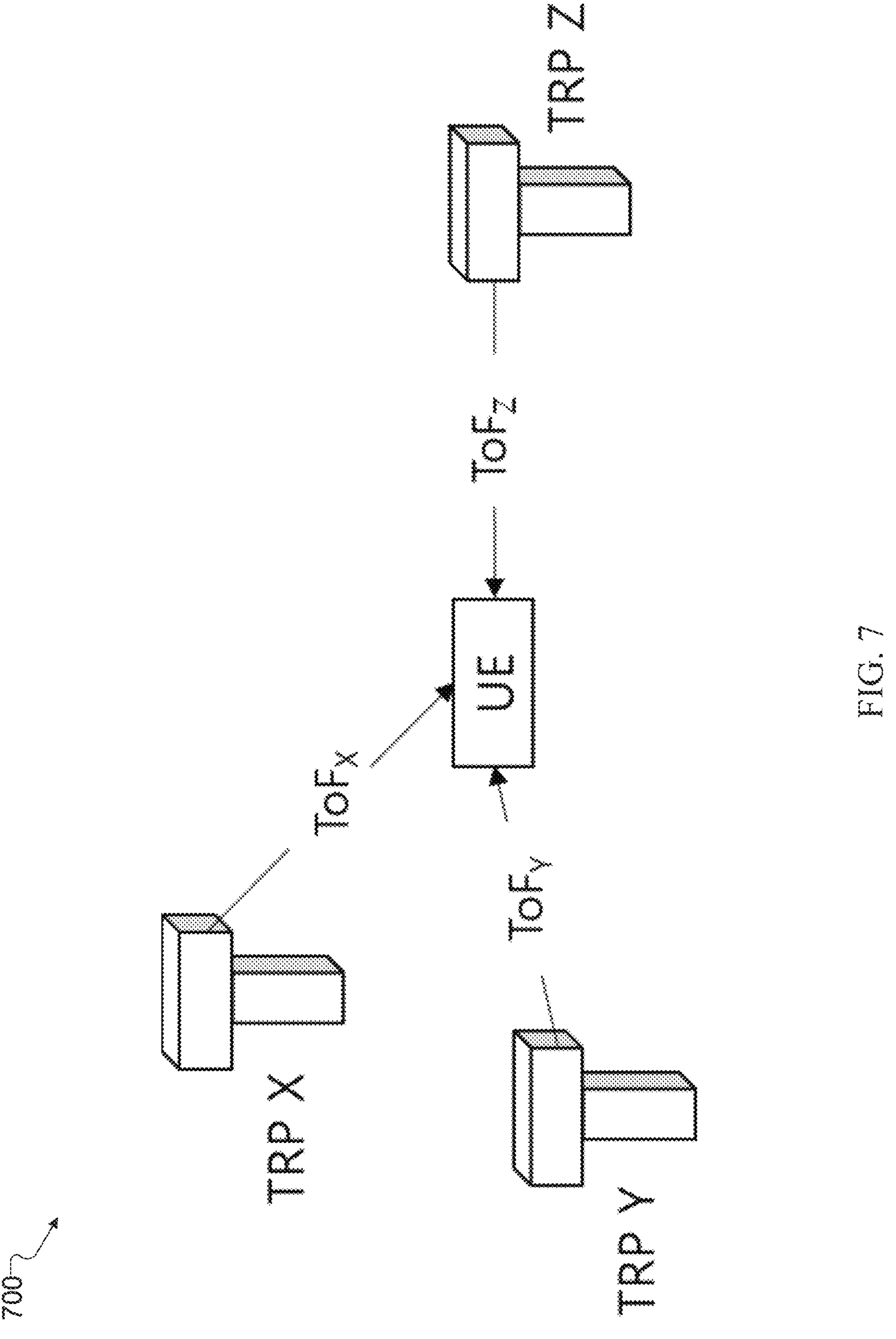
FIG. 7 illustrates a diagram of DL-time of flight (ToF) measurements according to embodiments of the present disclosure.

FIG. 7 illustrates a diagram of DL-time of flight (ToF) measurements 700 according to embodiments of the present disclosure. For example, DL-ToF measurements 700 can be performed by any of the UEs 111-116 of FIG. 1 to measure TRPs such as BSs 102-103 and/or antennas 205*a-n*. This example is for illustration only and other embodiments can be used without departing from the scope of the present disclosure.

In DL-TDOA based positioning, which involves serving TRP and at least two neighboring TRPs of a same cell or different cells, a UE measures ToF by detecting DL-PRS from each TRP. For a pair of TRPs, the UE calculates RSTD (reference signal time difference) by calculating the ToF difference from the two TRPs. Once RSTD measurements from multiple pairs of TRPs are obtained, hyperbolic multilateration is performed either at the LMF, i.e., UE-assisted positioning, or at the UE, i.e., UE-based positioning.

As an example of AI/ML-assisted positioning, the AWL model can improve the ToF or RSTD measurements in challenging situations such as NLOS environment or predict ToF or RSTD for one or multiple future instances.

For both AWL-based and AWL-assisted positionings, the DL-PRS overhead in temporal and spatial domains can be reduced by predicting intermediate metrics or the UE position itself in time or by predicting DL-PRS beams in spatial domain from wide or sparse beam sweeping.

The present disclosure is not limited to AWL-based positioning method only. The position prediction itself can be performed either using AI/ML-based method or non-AWL-based method such as using advanced signal processing techniques, e.g., interpolation, extrapolation, or extended Kalman filter, etc.

Embodiments of the present disclosure recognize the choice of a proper positioning model, either AI/ML-assisted or AWL-based, can be dependent on UE's channel environment and/or geographical location, while the model can be deployed either at a UE or at a network. Therefore, there is a need to define a set of signaling between the network and the UE regarding UE's channel environment and/or geographical location to assist positioning model selection either at the UE or at the network.

For UE-assisted positioning based on DL-AoD, the set of DL-PRS beams for measurements can be different, e.g., sparser or wider, than the set of beams defining beam space for prediction. Therefore, there is a need to define a set of signaling from the network to the UE to inform the relationship between the first set of beams and the second set of beams. When the DL-PRS beams are predicted for more than one instance, there is another need to enhance the measurement report containing RSRP values for multiple instances. There is yet another need to define a set of signaling from the UE to the network to provide assistance information for RSRP prediction performance monitoring.

For UE-assisted positioning based on DL-TDOA, the UE can be requested by the network to predict RSTD for more than one instance. Therefore, there is a need to enhance the measurement report containing RSTD values for multiple instances. There is yet another need to define a set of signaling from the UE to the network to provide assistance information for RSTD prediction performance monitoring.

For UE-based positioning, the UE can be requested by the network to predict its position for more than one instance. Therefore, there is a need to enhance the UE position report including UE coordinates for multiple instances. There is yet another need to define a set of signaling from the UE to the network to provide assistance information for UE-based positioning performance monitoring.

The performance of the currently used positioning model may degrade over time as the channel environment changes. Therefore, there is a need to define a set of signaling between the network and the UEs at known locations to collect various dataset for positioning model performance monitoring and for model update/finetuning/retraining, etc. There is yet another need to define a set of signaling to transfer those datasets collected from UEs at known positions to other UEs for model update/finetuning/retraining, etc., or to indicate the UEs to perform model switching or fallback to a common positioning method.

The present disclosure relates to a communication system. The present disclosure relates to defining functionalities and procedures to support prediction-based positioning, including both UE-based and UE-assisted positionings, in cellular systems.

The present disclosure further relates to indicating UE's channel environment and/or geographical location to assist positioning model selection either at the UE or at the network.

The present disclosure further relates to UE-assisted positioning based on DL-AoD including signaling the relationship between the beam space for DL-PRS measurement and the beam space for DL-AoD prediction, enhancing measurement report containing RSRP for multiple instances, and signaling assistance information for DL-AoD prediction model performance monitoring.

The present disclosure further relates to UE-assisted positioning based on DL-TDOA including enhancing measurement report containing RSTD for multiple instances and signaling assistance information for DL-TDOA prediction model performance monitoring.

The present disclosure further relates to UE-based positioning including enhancing UE position report for multiple instances and signaling assistance information for UE-based positioning model performance monitoring.

The present disclosure further relates to collecting datasets from UEs at known locations, transferring datasets to other UEs for model update/finetune/retraining, and signaling to switch to another model or fallback to one of the common positioning techniques.

Embodiments of the disclosure for prediction-based positioning in cellular systems are fully elaborated further herein.

Method and apparatus for indicating UE's channel environment and/or geographical location to assist positioning model selection either at the UE or at the network.

Method and apparatus for signaling the relationship between the beam space for DL-PRS measurement and the beam space for DL-AoD prediction, enhancing measurement report containing at least RSRP for multiple instances, and signaling assistance information for DL-AoD prediction model performance monitoring.

Method and apparatus for enhancing measurement report containing at least RSTD for multiple instances and signaling assistance information for DL-TDOA prediction model performance monitoring.

- Method and apparatus for enhancing UE position report for multiple instances and signaling assistance information for UE-based positioning model performance monitoring.
- Method and apparatus for collecting datasets from UEs at known locations, transferring datasets to other UEs for model update/finetune/retraining, and signaling to switch to another model or fallback to one of the common positioning techniques.

A detailed description of systems and methods consistent with embodiments of the present disclosure is provided herein. While several embodiments are described, it should be understood that the present disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the present disclosure.

The AWL-assisted or AWL-based positioning can be performed at a UE, at a network, or at both. When the AWL-assisted or AWL-based positioning is performed at a UE, the UE 116 sends intermediate metrics or its determined position, as an output of an AWL model, to the network 130. The AWL-assisted or AWL-based positioning can be also performed at a network based on a UE measurement report.

When the AWL-assisted or AWL-based positioning is performed at a UE, the UE 116 may have multiple positioning models designed and/or trained for particular scenarios and/or environment. In this case, the network 130 can provide assistance information to the UE 116 regarding validity conditions for a given model based on which the UE 116 can determine a proper model for a given environment. The following validity conditions can be signaled to the UE 116:

- The validity condition may include applicable area/zone, which may be indicated by cell ID, tracking area ID, or zone ID within a cell, etc.
- The validity condition may include applicable scenario/environment, which may be indicated in terms of urban macro (UMa)/urban micro (UMi)/indoor hotspot (InH)/rural, clutter/blockage presence/density/severity, LOS/NLOS, indoor/outdoor, in-car, mobility in terms of velocity or categorization of pedestrian/vehicle/high-speed train, etc.
- The validity condition may be provided in terms of maximum or minimum Doppler shift and/or delay spread.
- The validity condition may be provided in terms of valid time interval or validity timer.
- The validity condition may be provided in terms of RSRP threshold to the serving cell/neighboring cell, e.g., the RSRP from the serving cell becomes smaller/larger than a certain threshold and the RSRP from a neighboring cell becomes larger/smaller than a certain threshold.
- The validity condition may be provided in terms of UE location. If the UE 116's location deviates more than a certain distance, e.g., in meters, from the UE 116's current location, the distance between the UE 116 and a reference point, e.g., serving cell/TRP location, becomes greater/smaller than a certain distance or greater/smaller than a certain distance from the current distance, the distance between the UE 116 and another reference point, e.g., neighboring cell/TRP location, becomes smaller/greater than a certain distance or smaller/greater than a certain distance from the current distance.

When the AWL-assisted or AWL-based positioning is performed at a UE and the UE 116 has multiple positioning models designed and/or trained for particular scenarios and/or environment, the UE 116 provides to the network 130 the set of models supported by the UE 116, e.g., via model ID, with associated information and/or model functionality. The network 130 can indicate the UE 116 a model to be used by the UE 116, e.g., via model ID, based on the assistance information provided by the UE 116. When the network 130 signals model ID to the UE 116, the network 130 may also provide validity conditions associated with the model as disclosed herein. When the AWL-assisted or AWL-based positioning is performed at a network, the network 130 may have multiple positioning models developed and/or trained scenario-/site-specifically. The UE 116 may be requested by the network 130 to provide assistance information for model selection/switch at the network 130.

Herein are examples of assistance information for a proper positioning model selection or switch which can be provided either by the UE 116 to the network 130 if the inference is performed at the network 130 or by the network 130 to the UE 116 if the inference is performed at the UE 116.

In one example, the UE 116 provides the channel environment perceived by the UE 116 to the serving cell or the serving cell provides the channel environment of the UE 116 perceived by the network 130, e.g., based on UL reference signal measurement, to the UE 116, such as UMa/UMi/InH/rural, clutter/blockage presence/density/severity, LOS/NLOS indication, indoor/outdoor indication, in-car indication, in-building indication, mobility in terms of velocity (e.g., in an absolute value, in a range of values, or in a type of movement) or categorization of speeds, e.g., pedestrian/vehicle/high-speed train, etc.

In another example, the UE 116 provides to the serving cell, or the serving cell provides to the UE 116, on the Doppler profile measured on the channel between the UE 116 and the serving cell which may include Doppler spread, Doppler shift, relative Doppler shift.

In yet another example, the UE 116 provides to the serving cell, or the serving cell provides to the UE 116, on the multipath delay profile measured on the channel between the UE 116 and the serving cell which may include delay spread, per-path weight, delay, and Doppler value per each signal propagation path. For the case in which the UE 116 provides the multipath delay profile to the serving cell, the UE 116 may be provided by the serving cell a threshold for signal strength such that the weight, delay, Doppler values are reported to the serving cell for paths whose strength is greater than the threshold. The strength can be expressed in terms of amplitude or power of the signal. The strength can be measured by averaging the values over the subcarriers and/or symbols carrying reference signals or taken as the maximum values over the subcarriers and/or symbols carrying reference signals.

In yet another example, the UE 116 provides to the serving cell, or the serving cell provides to the UE 116, on the UE 116's geographical location and/or scenario which may be in terms of zone ID or scenario ID from a set of predefined scenarios. The definition of zones and the corresponding zone IDs can be provided by the serving cell to the UE 116. A zone may be comprised of one or multiple cells.

If a zone includes a single cell, then the zone ID may coincide with cell ID. If a zone includes one or multiple cells, the zone ID may coincide with tracking area ID.

In another example, a serving cell area is divided into multiple zones and assigned with unique IDs within the cell. A set of scenarios can be defined and signaled to the UE 116. It can be, for example, UMa/UMi/InH/rural scenarios, high/low clutter/blockage scenarios, LOS/NLOS scenarios, indoor/outdoor scenarios, in-car scenarios, in-building scenarios, pedestrian/vehicle/high-speed train scenarios, etc.

FIG. 8 illustrates a flowchart of an example procedure 800 for a UE to send prediction-based DL-AoD measurement reports measurements according to embodiments of the present disclosure. For example, procedure 800 for a UE to send prediction-based DL-AoD measurement reports to assist positioning at LMF can be performed by UE 116 of FIG. 3. This example is for illustration only and other embodiments can be used without departing from the scope of the present disclosure.

Procedure 800 begins with 810, a UE is provided from LMF information related to mapping a first set of DL-PRS beams to a second set of DL-PRS beams for each TRPs transmitting DL-PRS to the UE 116 and one or multiple instances for DL-PRS RSRP beam prediction and reporting. In 820, the UE 116 performs DL-PRS measurements on the first set of beams from each TRP transmitting DL-PRS according to the resource configuration provided by LMF. In 830, the UE 116 predicts DL-PRS RSRP of the second set of beams based on the measurements on the first set of beams for each TRP transmitting DL-PRS for one or multiple instances indicated by LMF. In 840, the UE 116 sends the report on its predicted DL-PRS RSRP to the LMF along with assistance information.

The UE 116 is provided from LMF information related to mapping a first set of DL-PRS beams to a second set of DL-PRS beams for each TRPs transmitting DL-PRS to the UE 116.

Figure 9:
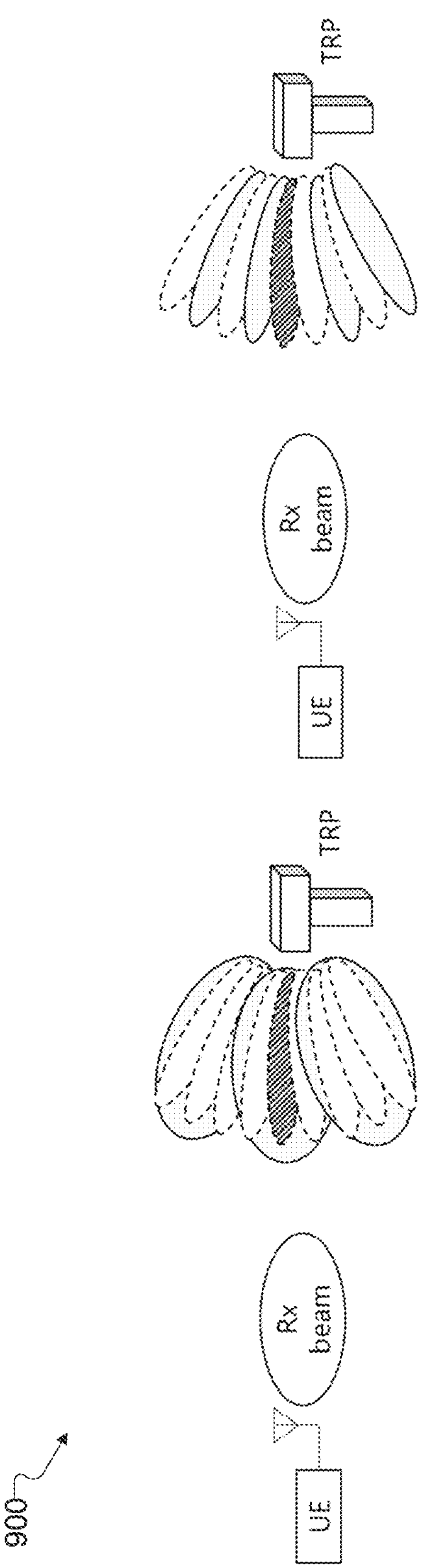
FIG. 9 illustrates a diagram of DL-AoD prediction from wide DL-PRS beam and sparse DL-PRS beam measurements according to embodiments of the present disclosure.

FIG. 9 illustrates a diagram of DL-AoD prediction 900 from wide DL-PRS beam and sparse DL-PRS beam measurements according to embodiments of the present disclosure. For example, prediction 900 from wide DL-PRS beam and sparse DL-PRS beam measurements can be performed by any of the UEs 111-116 of FIG. 1. This example is for illustration only and other embodiments can be used without departing from the scope of the present disclosure.

In one example, the first set of beams may have wide beamwidth than the second set of beams, which may be due to limited spatial granularity because of the limited antenna array size at TRPs or may be to reduce DL-PRS beam sweeping overhead. One wide beam in the first set can be mapped to multiple narrow beams in the second set. The serving cell informs the UE 116 on how many narrow beams in the second set are associated with a beam in the first set and their mapping relationship, e.g., in terms of angular offset, 3-dB beamwidth, beam pattern, amplitude/power of the beam, etc., with respect to the beam in the first set.

In another example, the first set of beams may be sparser than the second set of beams, e.g., the first set of beams is a subset of the second set of beams, which may be to reduce DL-PRS beam sweeping overhead. One beam in the first set can be mapped to multiple adjacent beams of the same characteristics, e.g., in terms of 3-dB beamwidth, etc., in the second set. The serving cell informs the UE 116 on how many beams in the second set are associated with a beam in the first set and their mapping relationship, e.g., in terms of angular offset, etc., with respect to the beam in the first set.

In yet another example, the first and the second set of beams are identical.

The UE 116 is also provided from the serving cell one or multiple instances for DL-PRS RSRP beam prediction and reporting. The one or multiple instances may include the instance in which the DL-PRS beam measurement resource is configured for the first set of beams. The one or multiple instances may also include future instances later than the instances in which the beam measurement resources are configured.

In one example, a UE can be indicated by the serving cell the prediction window for which the UE 116 predicts future DL-PRS RSRP/reference signal received quality (RSRQ)/signal to interference and noise ratio (SINR) from each TRPs and, consequently, AoD from each TRPs. The prediction window (e.g., valid time duration) can be indicated to the UE 116 with duration and offset from the reference resource for the measurement of the first set of beams, e.g., $\{n_{ref}+o, \ldots, n_{ref}+o+W_p\}$, where $W_p$ is the prediction window duration and o is the prediction start offset from the reference resource at $n_{ref}$. Both $W_p$ and o can take zero or positive integer values.

In another example, the UE 116 can be indicated by the serving cell the prediction start offset o, the prediction interval I, and the number of instances for prediction K. Accordingly, the UE 116 predicts the DL-PRS beams from the second set of beams for a set of instances $\{n_{ref}+0, n_{ref}+o+I, n_{ref}+o+2\cdot I, \ldots, n_{ref}+o+(K-1)\cdot I\}$.

Alternatively, the UE 116 can be indicated by the network 130 a set of offset values indicating future instances for prediction. For instance, the network 130 can indicate a set of offset values, e.g., $\{o_1, o_2, o_3\}$, to the UE 116, and the UE 116 predicts the DL-PRS beams for $\{n_{ref}+o_1, n_{ref}+o_2, n_{ref}+o_3\}$.

When the UE 116 sends DL-PRS measurement report to the serving cell, the UE 116 can be indicated by the serving cell whether the report shall include RSRP/RSRQ/SINR/RSRPP values for the top-1 strongest DL-PRS beams, top-K strongest DL-PRS beams or for all the DL-PRS beams, along with the beam index or DL-PRS measurement resource index. The UE 116 can be also indicated by the serving cell whether the UE 116 shall report the measurements from the first set of beams, second set of beams, or both from the first and the second set of beams.

When the reports include more than one instance, the RSRP/RSRQ/SINR/RSRPP values of the beam in the first instance is reported and the differential RSRP/RSRQ/SINR/RSRPP from the first instance or the previous instance, i.e., k-th instance as a reference for reporting k+1-th instance, is reported for the rest of instances. In this case, the differential RSRP/RSRQ/SINR/RSRPP can take positive or negative values.

For example, the sign of differential RSRP/RSRQ/SINR/RSRPP can be indicated via Boolean indication.

Alternatively, multiple reporting instances are ordered in terms of RSRP/RSRQ/SINR/RSRPP values, and the RSRP/RSRQ/SINR/RSRPP of the strongest instance is reported along with the index indicating the reporting instance and the differential RSRP/RSRQ/SINR/RSRPP from the strongest instance or the next stronger instance, i.e., differential RSRP/RSRQ/SINR/RSRPP of n+1-th strongest instance from n-th strongest instance, is reported for the rest of instances along with the index indicating the reporting instance. When each reporting instance includes more than one DL-PRS beams for non-strongest DL-PRS beams, differential RSRP/RSRQ/SINR/RSRPP can be reported from the strongest or next stronger RSRP/RSRQ/SINR/RSRPP within the instance or strongest RSRP/RSRQ/SINR/RSRPP of the first reported instance, where the first reported instance can be the earliest instance in time or the instance containing strongest RSRP/RSRQ/SINR/RSRPP value.

When the UE 116 sends DL-PRS measurement report to the network 130, the UE 116 can send the assistance information to the network 130 including the following:

- Probability of n-th strongest predicted DL-PRS beam to be within N actual strongest DL-PRS beams at the predicted future instance. This information can be per TRP transmitting DL-PRS to the UE 116.
- The spatial information of UE's receive beam, e.g., receive beam ID, beam direction, 3-dB beam width, spatial filter, etc., is used for DL-PRS measurements. This information can be per TRP transmitting DL-PRS to the UE 116.
- Indication on the requirement of more/less resources for DL-PRS beam measurement, i.e., more/less spatial beam sweeping, to perform prediction. This information can be per TRP transmitting DL-PRS to the UE 116.
- Preferred angular range of DL-PRS beam directions for the reference signal configuration. This information can be per TRP transmitting DL-PRS to the UE 116.
- Indication on the requirement of more/less frequent DL-PRS beam measurement resources in time.
- UE channel environment, e.g., UMa/UMi/InH/rural, clutter/blockage presence/density/severity, LOS/NLOS indication, indoor/outdoor indication, in-car indication, in-building indication, mobility in terms of velocity or categorization of speeds, e.g., pedestrian/vehicle/high-speed train, etc. Some information can be TRP common, e.g., indication on UMa/UMi/InH/rural, while some other information can be per TRP transmitting DL-PRS to the UE 116, e.g., LOS/NLOS indication.

Figure 10:
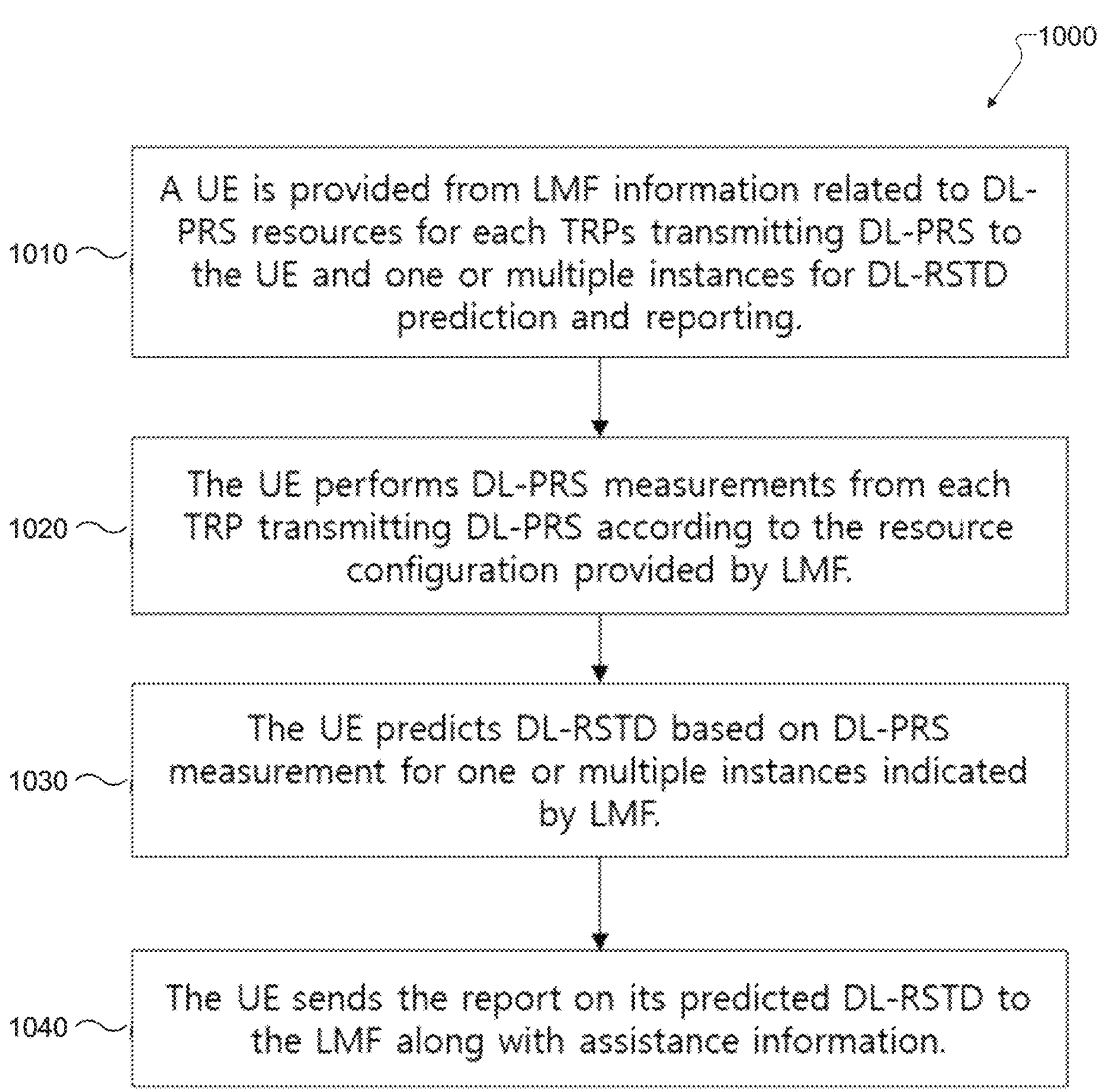
FIG. 10 illustrates a flowchart of an example procedure for a UE to send a prediction-based DL-reference signal time difference (RSTD) measurement report to assist positioning at LMF according to embodiments of the present disclosure.

FIG. 10 illustrates a flowchart of an example procedure 1000 for a UE to send a prediction-based DL-RSTD measurement report to assist positioning at LMF according to embodiments of the present disclosure. For example, procedure 1000 for a UE to send a prediction-based DL-RSTD measurement report to assist positioning at LMF can be performed by UE 116 of FIG. 3. This example is for illustration only and other embodiments can be used without departing from the scope of the present disclosure.

The procedure begins in 1010, a UE is provided from LMF information related to DL-PRS resources from each TRPs transmitting DL-PRS to the UE 116 and one or multiple instances for DL-RSTD prediction and reporting. In 1020, the UE 116 performs DL-PRS measurements from each TRP transmitting DL-PRS according to the resource configuration provided by LMF. In 1030, the UE 116 predicts DL-RSTD based on DL-PRS measurement for one or multiple instances indicated by LMF. In 1040, the UE 116 sends the report on its predicted DL-RSTD to the LMF along with assistance information.

Figure 11:
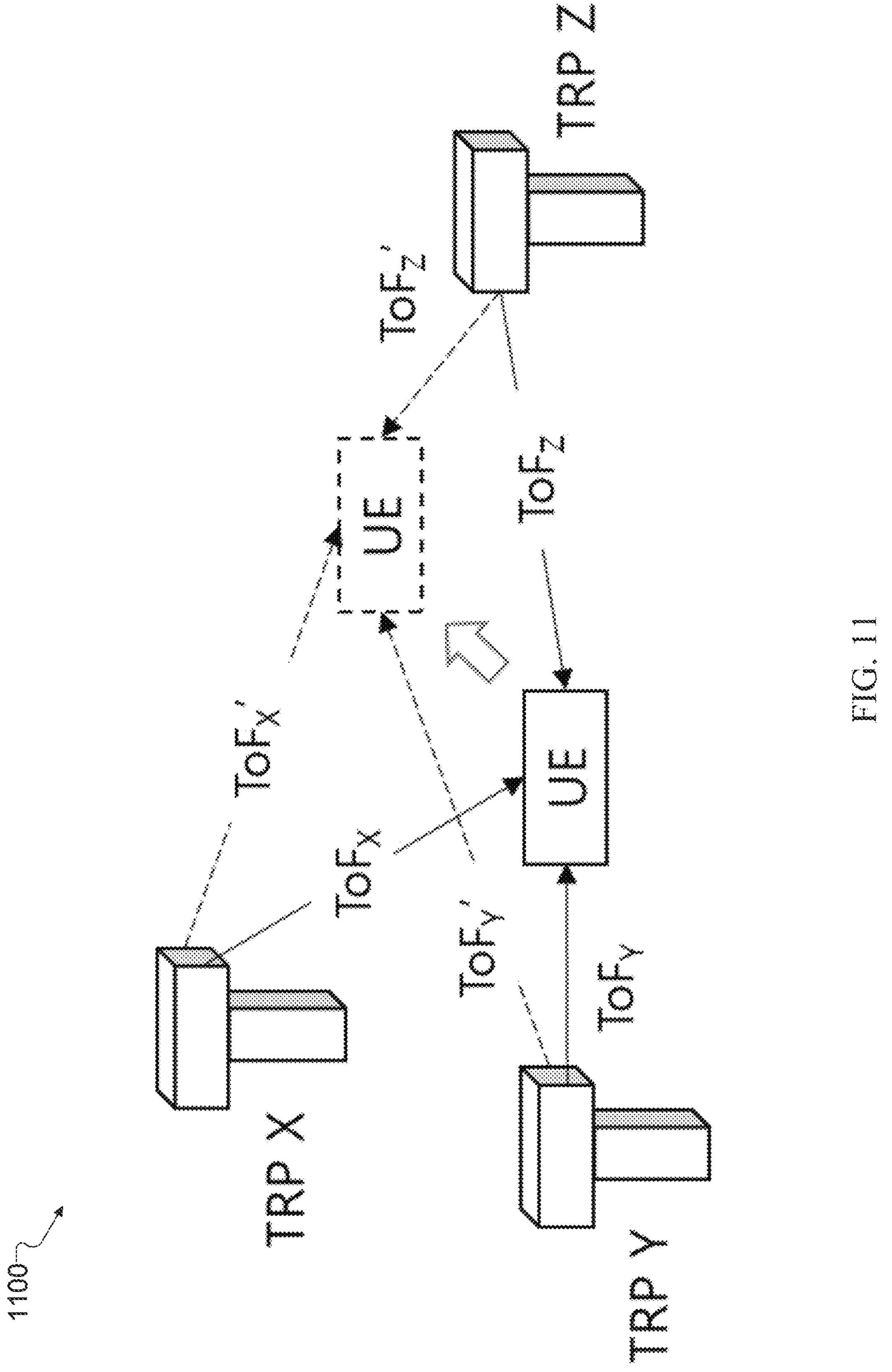
FIG. 11 illustrates a diagram of an example DL-RSTD prediction from multi-TRPs according to embodiments of the present disclosure.

FIG. 11 illustrates a diagram of an example DL-RSTD prediction 1100 from multi-TRPs according to embodiments of the present disclosure. For example, DL-RSTD prediction 1100 from multi-TRPs can be performed by any of the UEs 111-116 of FIG. 1 to measure from TRPs such as BS 102-103 and/or antennas 205*a-n*. This example is for illustration only and other embodiments can be used without departing from the scope of the present disclosure.

The UE 116 can be provided from the serving cell one or multiple instances for RSTD prediction and reporting. The one or multiple instances may include the instance in which the DL-PRS measurement resource is configured. The one or multiple instances may also include future instances later than when the measurement is performed. The UE 116 can be indicated by the serving cell the one or multiple instances for RSTD prediction using indication methods as disclosed herein. The UE 116 position can be changed from one instance to another due to UE mobility. For the indicated one or multiple instances, the UE 116 can predict the ToF from each TRPs and the resulting RSTD values by taking into account it's moving speed, direction, and/or trajectory in the prediction model, either AWL-based or non-AWL-based.

When a report for a given instance includes multiple RSTD values for multiple pairs of TRPs, the UE 116 sends to the serving cell the RSTD value for the first pair of TRPs and the differential RSTD values for the rest pairs of TRPs, where the difference is taken from the first pair of TRPs or the previous pair of TRPs for which the RSTD value is encoded in the report. The RSTD values can be reported in the descending or ascending order of RSTD values.

When the UE 116 reports RSTD for more than one instance, the RSTD for each instance can be reported with a corresponding timestamp to when the prediction is performed. The UE 116 sends to the serving cell the RSTD value for the first instance and the differential RSTD values for the subsequent instances, where the difference is taken from the first reported instance or the previous reported instance, for a given TRP pair.

Alternatively, multiple reporting instances are sorted in the descending or ascending order of RSTD values and the instance with smallest or largest RSTD value is reported first and the differential RSTD values are reported from the first reported instance, the previous reported instance along with index indicating the reported instance, or timestamp for a given TRP pair.

When each reporting instance includes more than one RSTD value for more than one TRP pairs, differential RSTD can be reported from the first reported RSTD value within the instance or the first reported RSTD within the first reported instance, where the first reported instance can be the earliest instance in time, the instance containing smallest, or largest RSTD value after sorting in the ascending or descending order.

When the UE 116 sends RSTD measurement report to the network 130, the UE 116 can send the assistance information to the network 130 as disclosed herein. In addition, the UE 116 can send the confidence on the predicted future RSTD values, estimated RSRP/RSRQ/received signal strength indicator (RSSI)/SINR/RSRPP values from each TRPs in the predicted future instances with timestamp.

Figure 12:
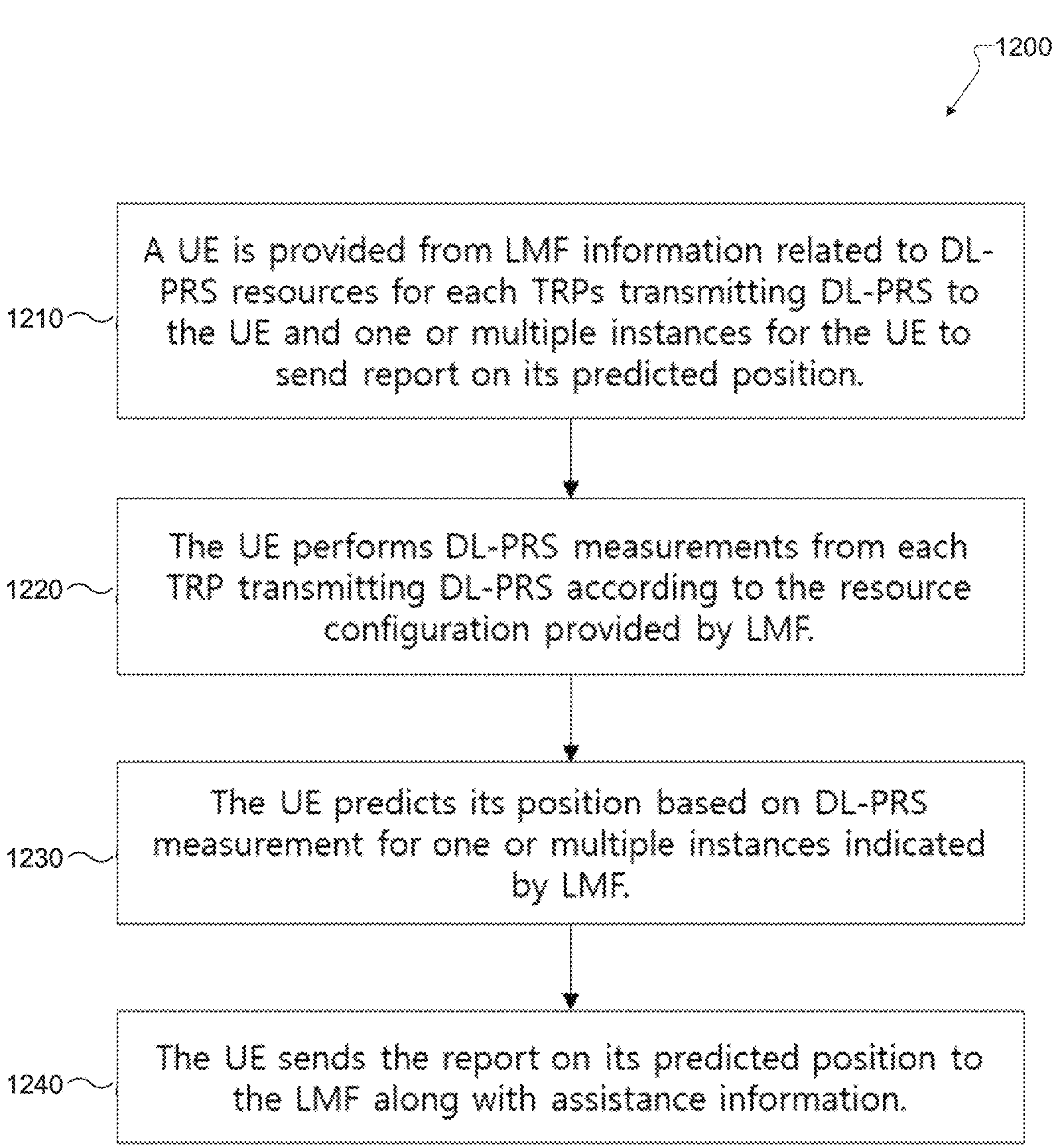
FIG. 12 illustrates a flowchart of an example procedure for a UE to send its predicted position to LMF according to embodiments of the present disclosure.

FIG. 12 illustrates a flowchart of an example procedure 1200 for a UE to send its predicted position to LMF according to embodiments of the present disclosure. For example, procedure 1200 for a UE to send its predicted position to LMF can be performed by the UE 116 of FIG. 3. This example is for illustration only and other embodiments can be used without departing from the scope of the present disclosure.

The procedure begins in 1210, a UE is provided from LMF information related to DL-PRS resources for each TRPs transmitting DL-PRS to the UE 116 and one or multiple instances for the UE 116 to send report on its predicted position. In 1220, the UE 116 performs DL-PRS measurements from each TRP transmitting DL-PRS according to the resource configuration provided by LMF. In 1230, the UE 116 performs DL-PRS measurements from each TRP transmitting DL-PRS according to the resource configuration provided by LMF. In 1240, the UE 116 sends the report on its predicted position to the LMF along with assistance information.

The UE 116 can provide information on the set of models supported by the UE 116 to the network 130, e.g., via model ID, with associated information and/or model functionality. The network 130 indicates to the UE 116 a model to be used by the UE 116, e.g., via model ID, based on the assistance information provided by the UE 116.

Alternatively, the network 130 can provide the assistance information to the UE 116 for a proper model selection. Possible assistance information that can be exchanged between the UE 116 and the network 130 is as disclosed herein.

When the UE 116 reports its position for more than one instances, the UE 116 position for each instance can be reported with corresponding timestamp. A UE reports its coordinates, e.g., in terms of Cartesian, Polar, spherical coordinates, azimuth/elevation, Latitude/Longitude/Altitude, possibly along with uncertainty shape for the earliest instance in time. For the subsequent instances, the UE 116 sends differential coordinates from the earliest instance or from the previous instance prior to the current instance, i.e., differential coordinates for n+1-th instance from n-th instance, where the instances are ordered in time. The UE 116 sends report on its predicted positions to the LMF along with assistance information as disclosed herein.

A UE at a known location can be requested by the network 130 to provide dataset such as DL-PRS measurements, channel impulse response, or any relevant intermediate metrics such as RSTD, RSRP/RSRQ/RSSI/SINR/RSRPP, UE Rx-Tx time difference, AoD, etc., to the network 130 or requested by the network 130 to transmit SRS for TRPs to measure UL channel impulse repose, AoA, etc. The UE 116 can be also requested by the network 130 to provide the following information:

- UE location coordinate.
- UE mobility related information such as trajectory, moving direction and speed, etc.
- Various UE perceived channel environment, Doppler shift, delay spread, as disclosed herein.
- Statistics/distribution related to AI/ML model input data, such as DL-PRS measurements, channel impulse response or any relevant intermediate metrics such as RSTD, RSRP/RSRQ/RSSI/SINR/RSRPP, UE Rx-Tx time difference, AoD, AoA, etc. Additionally, the UE 116 can be indicated by the serving cell conditions to report information related to input data statistics/distribution, e.g., threshold on the deviation of the input data statistics/distribution from the nominal statistics/distribution, etc.
- Statistics/distribution related to AI/ML model output data, such as determined UE position for UE-based positioning and intermediate metrics, e.g., RSTD, RSRP/RSRQ/RSSI/SINR/RSRPP, AoD, AoA, Rx-Tx time difference, for UE-assisted positioning. Additionally, the UE 116 can be indicated by the serving cell conditions to report information related to output data statistics/distribution, e.g., threshold on the deviation of the output data statistics/distribution from the nominal statistics/distribution, etc.
- Location/intermediate metric estimation accuracy. In one example, the UE 116 can send to the network 130 the difference of estimated UE location or any intermediate metrics using AI/ML, any advanced signal processing technique from the known ground truth UE location, or any known ground truth intermediate metrics, i.e., to measure the effectiveness of the currently deployed model. Additionally, the UE 116 can be indicated by the serving cell conditions to report, e.g., threshold on the deviation of the estimated UE location or any intermediate metrics from the known ground truth UE location or any intermediate metrics.

Based on the data collected from UEs at known locations, the network 130 can determine the effectiveness of the currently deployed positioning model at other UEs. A UE can be provided by the serving cell dataset that the serving cell collected from UEs at known locations as those disclosed for the UE 116 to perform model update, finetuning, and/or retraining.

Alternatively, a UE can be instructed by the serving cell to establish D2D/sidelink connections with nearby UEs at known locations to get the dataset transferred directly from the UEs at known locations over D2D/sidelink.

Alternatively, the UE 116 can be indicated by the serving cell a model ID for the UE 116 to perform model switching. The UE 116 can be also provided with validity conditions for the provided model ID.

Alternatively, the UE 116 can be indicated by the serving cell a common positioning technique, e.g., multi-RTT, UL TDOA, DL TDOA, UL AoA, DL AoD, to fallback along with DL-PRS or UL-SRS resource configurations.

The UE 116 can be also requested by the serving cell to compare its own input and/or output data statistics/distribution from the provided dataset and report the difference. The difference can be measured, for instance, in terms of mean, median, variance, standard deviation, distribution type, range, max/min values, difference between reported and corresponding ground-truth values, etc. Additionally, the UE 116 can be indicated by the serving cell conditions to report, such as threshold on the deviation of the input/output data statistics/distribution.

As an example, the threshold can be provided in terms of mean, median, variance, distribution, range, max/min values, etc.

Based on the data collected from UEs at known locations, the network 130 can calculate a position correction term, e.g., in terms of Latitude/Longitude/Altitude, to be added to the UE 116 reported position. The correction term can be calculated for intermediate metrics as disclosed herein and added to UE reported intermediate metrics. These correction terms can be sent to UEs for the UEs to correct before they send positioning report.

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for a user equipment (UE) to report information related to UE positioning based on machine learning (ML), the method comprising:

receiving:

from a cell, first information related to reception of positioning reference signals (PRSs) from one or more transmission and reception points (TRPs) for measurements, from the cell, second information indicating one or more reporting quantities related to the UE positioning, wherein the one or more reporting quantities are related to the UE positioning inferred by a ML model at the UE, from the one or more TRPs, the PRSs based on the first information;

measuring the PRSs;

determining the one or more reporting quantities indicated by the second information based on the measurement of the PRSs; and transmitting the one or more reporting quantities.

2. The method of claim 1, wherein:

the one or more reporting quantities indicated by the second information are related to one or more UE locations corresponding to one or more instances, and the one or more reporting quantities for an instance includes:

a UE coordinate, a timestamp, or parameters related to a confidence of a reported coordinate, and the one or more reporting quantities for an instance is reported relative to another instance or reported independently from other instances.

3. The method of claim 1, wherein:

the one or more reporting quantities indicated by the second information are related to the UE positioning for one or more instances, the one or more reporting quantities related to the UE positioning for an instance includes:

a reference signal received power (RSRP), a reference signal received quality (RSRQ), a signal to interference plus noise ratio (SINR), an angle of departure (AoD), a reference signal timing difference (RSTD), a timestamp, or parameters related to a confidence of the one or more reporting quantities, and the one or more reporting quantities related to the UE positioning for an instance is reported relative to another instance or reported independently from other instances.

4. The method of claim 1, wherein:

the one or more reporting quantities indicated by the second information are associated with data for training the ML model, and the one or more reporting quantities includes:

a UE coordinate, parameters related to a channel impulse response, a reference signal received power (RSRP), a reference signal received quality (RSRQ), a received signal strength indicator (RSSI), a signal to interference plus noise ratio (SINR), a reference signal received path power (RSRPP), a time difference between reception and transmission, an angle of departure (AoD), a timestamp, parameters related to statistics of input data to the ML model, parameters related to statistics of output data from the ML model, or parameters related to a confidence of the one or more reporting quantities reported including differences between the determined one or more reporting quantities and corresponding ground-truth values of the one or more reporting quantities.

5. The method of claim 1, further comprising:

receiving or transmitting information related to selecting the ML model, wherein the information includes:

parameters related to Doppler profile, parameters related to multi-path delay profile, parameters related to channel environment, parameters related to clutters or blockages, an indicator of line-of-sight (LOS) or non-line-of-sight (NLOS), an indicator of indoor or outdoor environment, an indicator of an in-car environment, an indicator of an in-building environment, or a velocity of the UE in an absolute value, in a range of values, or in a type of movement.

6. The method of claim 1, further comprising:

receiving information related to determining a validity of the ML model, wherein the information includes:

parameters related to an area, a valid time duration, one or more reference signal received power (RSRP) threshold values from respective one or more cells or TRPs, parameters in terms of a UE location, or parameters related to a channel environment.

7. The method of claim 1, further comprising:

transmitting a channel with information related to updating the PRSs receptions for measurements, wherein the information indicates at least one of:

a preferred direction of the PRSs receptions, a preferred spatial granularity of the PRSs receptions, and a preferred temporal frequency of the PRSs receptions.

8. A user equipment (UE) comprising:

a transceiver configured to receive:

from a cell, first information related to reception of positioning reference signals (PRSs) from one or more transmission and reception points (TRPs) for measurements, from the cell, second information indicating one or more reporting quantities related to UE positioning, wherein the one or more reporting quantities are related to the UE positioning inferred by a machine learning (ML) model at the UE, and from the one or more TRPs, the PRSs based on the first information; and a processor operably coupled with the transceiver, the processor configured to:

measure the PRSs, and determine the one or more reporting quantities indicated by the second information based on the measurement of the PRSs, wherein the transceiver is further configured to transmit the one or more reporting quantities.

9. The UE of claim 8, wherein:

the one or more reporting quantities indicated by the second information are related to one or more UE locations corresponding to one or more instances, and the one or more reporting quantities for an instance includes:

a UE coordinate, a timestamp, or parameters related to a confidence of a reported coordinate, and the one or more reporting quantities for an instance is reported relative to another instance or reported independently from other instances.

10. The UE of claim 8, wherein:

the one or more reporting quantities indicated by the second information are related to the UE positioning for one or more instances, the one or more reporting quantities related to the UE positioning for an instance includes:

a reference signal received power (RSRP), a reference signal received quality (RSRQ), a signal to interference plus noise ratio (SINR), an angle of departure (AoD), a reference signal timing difference (RSTD), a timestamp, or parameters related to a confidence of the one or more reporting quantities, and the one or more reporting quantities related to the UE positioning for an instance is reported relative to another instance or reported independently from other instances.

11. The UE of claim 8, wherein:

the one or more reporting quantities indicated by the second information are associated with data for training the ML model, and the one or more reporting quantities includes:

a UE coordinate, parameters related to a channel impulse response, a reference signal received power (RSRP), a reference signal received quality (RSRQ), a received signal strength indicator (RSSI), a signal to interference plus noise ratio (SINR), a reference signal received path power (RSRPP), a time difference between reception and transmission, an angle of departure (AoD), a timestamp, parameters related to statistics of input data to the ML model, parameters related to statistics of output data from the ML model, or parameters related to a confidence of the one or more reporting quantities reported including differences between the determined one or more reporting quantities and corresponding ground-truth values of the one or more reporting quantities.

12. The UE of claim 8, wherein:

the transceiver is further configured to receive or transmit information related to selecting the ML model, and the information includes:

parameters related to Doppler profile, parameters related to multi-path delay profile, parameters related to channel environment, parameters related to clutters or blockages, an indicator of line-of-sight (LOS) or non-line-of-sight (NLOS), an indicator of indoor or outdoor environment, an indicator of an in-car environment, an indicator of an in-building environment, or a velocity of the UE in an absolute value, in a range of values, or in a type of movement.

13. The UE of claim 8, wherein:

the transceiver is further configured to receive information related to determining a validity of the ML model, and the information includes:

parameters related to an area, a valid time duration, one or more reference signal received power (RSRP) threshold values from respective one or more cells or TRPs, parameters in terms of a UE location, or parameters related to a channel environment.

14. The UE of claim 8, wherein:

the transceiver is further configured to transmit a channel with information related to updating the PRSs receptions for measurements, and the information indicates at least one of:

a preferred direction of the PRSs receptions, a preferred spatial granularity of the PRSs receptions, and a preferred temporal frequency of the PRSs receptions.

15. A base station (BS) comprising:

a transceiver configured to:

transmit first information related to reception of positioning reference signals (PRSs) from one or more transmission and reception points (TRPs) for measurements, transmit second information indicating one or more reporting quantities related to user equipment (UE) positioning, wherein the one or more reporting quantities are related to the UE positioning inferred by a machine learning (ML) model at the UE wherein the PRSs are transmitted from the one or more TRPs based on the first information, and receive the one or more reporting quantities, the one or more reporting quantities determined based on the second information and the PRSs.

16. The BS of claim 15, wherein:

the one or more reporting quantities indicated by the second information are related to one or more UE locations corresponding to one or more instances, and the one or more reporting quantities for an instance includes:

a UE coordinate, a timestamp, or parameters related to a confidence of a reported coordinate, and the one or more reporting quantities for an instance is reported relative to another instance or reported independently from other instances.

17. The BS of claim 15, wherein:

the one or more reporting quantities indicated by the second information are related to the UE positioning for one or more instances, the one or more reporting quantities related to the UE positioning for an instance includes:

a reference signal received power (RSRP), a reference signal received quality (RSRQ), a signal to interference plus noise ratio (SINR), an angle of departure (AoD), a reference signal timing difference (RSTD), a timestamp, or parameters related to a confidence of the one or more reporting quantities, and the one or more reporting quantities related to the UE positioning for an instance is reported relative to another instance or reported independently from other instances.

18. The BS of claim 15, wherein:

the one or more reporting quantities indicated by the second information are associated with data for training the ML model, and the one or more reporting quantities includes:

a UE coordinate, parameters related to a channel impulse response, a reference signal received power (RSRP), a reference signal received quality (RSRQ), a received signal strength indicator (RSSI), a signal to interference plus noise ratio (SINR), a reference signal received path power (RSRPP), a time difference between reception and transmission, an angle of departure (AoD), a timestamp, parameters related to statistics of input data to the ML model, parameters related to statistics of output data from the ML model, or parameters related to a confidence of the one or more reporting quantities reported including differences between the determined one or more reporting quantities and corresponding ground-truth values of the one or more reporting quantities.

19. The BS of claim 15, wherein:

the transceiver is further configured to receive or transmit information related to selecting the ML model, and the information includes:

parameters related to Doppler profile, parameters related to multi-path delay profile, parameters related to channel environment, parameters related to clutters or blockages, an indicator of line-of-sight (LOS) or non-line-of-sight (NLOS), an indicator of indoor or outdoor environment, an indicator of an in-car environment, an indicator of an in-building environment, or a velocity of the UE in an absolute value, in a range of values, or in a type of movement.

20. The BS of claim 15, wherein:

the transceiver is further configured to receive information related to determining a validity of the ML model, and the information includes:

parameters related to an area, a valid time duration, one or more reference signal received power (RSRP) threshold values from respective one or more cells or TRPs, parameters in terms of a UE location, or parameters related to a channel environment.

* * * * *